United States Patent
Theiler et al.

(10) Patent No.: US 9,628,264 B2
(45) Date of Patent: Apr. 18, 2017

(54) HOST COMMUNICATION CIRCUIT, CLIENT COMMUNICATION CIRCUIT, COMMUNICATION SYSTEM AND COMMUNICATION METHOD

(71) Applicant: ams AG, Unterpremstaetten (AT)

(72) Inventors: Helmut Theiler, Lieboch (AT); Alexander Costa, Graz (AT)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 14/785,621

(22) PCT Filed: Apr. 9, 2014

(86) PCT No.: PCT/EP2014/057175
§ 371 (c)(1),
(2) Date: Oct. 19, 2015

(87) PCT Pub. No.: WO2014/170181
PCT Pub. Date: Oct. 23, 2014

(65) Prior Publication Data
US 2016/0080141 A1      Mar. 17, 2016

(30) Foreign Application Priority Data
Apr. 19, 2013   (EP) ..................................... 13164549

(51) Int. Cl.
*H04L 7/06*     (2006.01)
*H04L 5/14*     (2006.01)
(Continued)

(52) U.S. Cl.
CPC .............. *H04L 7/06* (2013.01); *H04L 5/1423* (2013.01); *H04B 5/0031* (2013.01); *H04L 7/007* (2013.01); *H04L 7/033* (2013.01); *H04L 12/10* (2013.01)

(58) Field of Classification Search
CPC ............................. H04L 12/10; H04B 5/0031
See application file for complete search history.

(56) References Cited

U.S. PATENT DOCUMENTS

| 4,159,448 A | 6/1979 | Parham |
| 4,477,896 A | 10/1984 | Aker |
(Continued)

FOREIGN PATENT DOCUMENTS

| DE | 102005014783 A1 | 10/2006 |
| DE | 102011104268 A1 | 12/2012 |
(Continued)

*Primary Examiner* — Ross Varndell
(74) *Attorney, Agent, or Firm* — McDermott Will & Emery LLP

(57) ABSTRACT

A communication system has a host communication circuit and a client communication circuit, which are connected to each other by means of a single signal wire. The host communication circuit generates a voltage modulated signal on the signal wire based on a reference clock signal, which in each clock cycle has a first period with a significant voltage change based on a clock edge of the reference clock signal, and a second period with a basically constant voltage variation. The host communication circuit (HCC) further can demodulate a current modulated signal received via the signal wire from the client communication circuit. The client communication circuit is configured to detect the significant voltage change in order to generate respective sync pulses in a sync signal, which is used to generate a client clock signal. A current modulation is performed by the client communication circuit based on the data to be transmitted a predetermined settling time after one of the sync pulses until the respective following sync pulse.

23 Claims, 9 Drawing Sheets

(51) Int. Cl.
*H04L 12/10* (2006.01)
*H04B 5/00* (2006.01)
*H04L 7/00* (2006.01)
*H04L 7/033* (2006.01)

(56) References Cited

U.S. PATENT DOCUMENTS

| | | | |
|---|---|---|---|
| 2008/0049606 A1* | 2/2008 | Rhelimi | H04L 5/1423 |
| | | | 370/212 |
| 2008/0183929 A1 | 7/2008 | Gottswinter | |
| 2009/0252068 A1 | 10/2009 | Charles et al. | |
| 2013/0094373 A1* | 4/2013 | Reidl | H04L 25/4902 |
| | | | 370/252 |
| 2014/0205109 A1 | 7/2014 | Theiler | |

FOREIGN PATENT DOCUMENTS

| | | |
|---|---|---|
| EP | 0393233 A2 | 10/1990 |
| WO | 2010/020838 A1 | 2/2010 |

* cited by examiner

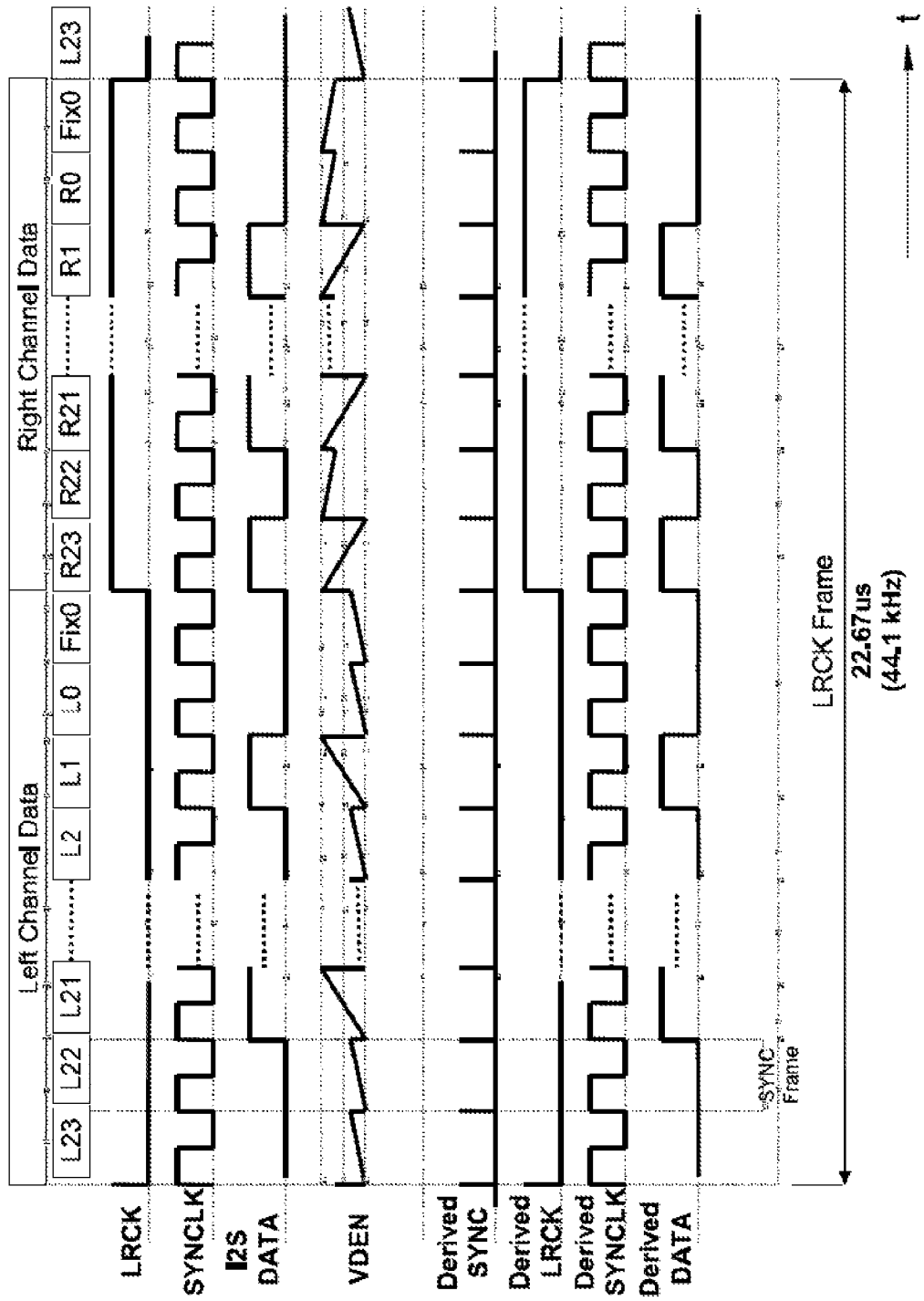

HOST COMMUNICATION CIRCUIT, CLIENT COMMUNICATION CIRCUIT, COMMUNICATION SYSTEM AND COMMUNICATION METHOD

FIELD OF THE INVENTION

The invention relates to a host communication circuit, a client communication circuit, a communication system with such a host communication circuit and such a client communication circuit, and to a method for communication between a host side and a client side.

BACKGROUND OF THE INVENTION

Systems doing data communication from a peripheral device or client device to a host device with current modulation on a voltage supply line are well-known and widely used. Such systems are using the fact that the supply line has a constant voltage, such that a fast and non-interrupted bit stream can be sent by modulating the current on the supply line. A performance of such data transmission is better in the case of current modulation pulses being larger than, for instance AC components of a supply current determined by other components connected to the supply line.

It may be desirable not only to transmit information from the client side to the host side but also to transmit information in the other direction.

SUMMARY OF THE INVENTION

It hence is desirable is to provide an efficient communication concept for a bidirectional communication over a single signal wire.

Such an efficient communication concept is based on the idea that on a single signal wire both a current modulation and a voltage modulation, each for one direction, can be performed, wherein both modulations are performed such that no or little mutual influence is generated. This is, for example, achieved by performing the voltage modulation such that voltage changes having potential impact on the current modulation are only made during a short period of a clock cycle, while a greater part of such a clock cycle is left for current modulation, for example in each clock cycle of a reference clock signal. For instance, a signal form of a voltage modulated signal is generated such that the voltage modulated signal has a significant voltage change, in particular a voltage step, a peak pulse, a spike pulse or the like, based on a clock edge of the reference clock signal in a first period of the clock cycle. In a second period of the clock cycle, the voltage modulated signal is generated with a constant or basically constant voltage variation. Herein, the first period is significantly shorter than the second period. At a predetermined time after the significant voltage change, which for example is based on a settling time due to the significant voltage change, a current modulation can be performed, e.g. until the end of the respective clock cycle.

Hence, clock information can be transmitted from a host side to a client side on a single signal wire, while any kind of data can be transmitted from the client side to the host side by means of the current modulation.

It should be noted that as well known in electrical engineering, spikes are fast, short duration electrical transients in voltage (voltage spikes), current (current spikes), or transferred energy (energy spikes) in an electrical circuit. According to the improved concept, voltage spikes may be used.

According to efficient communication concept, various embodiments of a host communication circuit and a client communication circuit will be described, which can be connected together, for example for forming a communication system. Furthermore, embodiments of a method for communication between a host side and a client side based on the efficient communication concept will be described.

For example, an embodiment of a host communication circuit is adapted to be connected to a client communication circuit by means of a single signal wire. The host communication circuit is configured to perform a voltage modulation on the signal wire by generating a voltage modulated signal based on a reference clock signal. In particular, in a first period of a clock cycle of the reference clock signal, the host communication circuit generates the voltage modulated signal with a significant voltage change, in particular a voltage step, a peak pulse, a spike pulse or the like, based on a clock edge of the reference clock signal. In a second period of the clock cycle, the host communication circuit generates the voltage modulated signal with a basically constant voltage variation, wherein the first period is significantly shorter than the second period. The host communication circuit is further configured to demodulate a current modulated signal received via the signal wire from a connected client communication circuit.

For example, the first period takes up about 5% to 10% of the clock cycle, whereas the second period takes up the rest of the clock cycle. Assuming that the signal wire connecting the host communication circuit and the client communication circuit during operation has parasitic capacitances, the significant voltage change having a high and possibly varying voltage gradient dV/dt results in a declining current on the signal wire. Due to the short duration of the first period, and the constant or basically constant voltage variation during the second period, the current influence on the signal wire becomes negligible, as it basically becomes a DC current. Hence, the current modulation on the client side can be performed efficiently.

On the client side, the client communication circuit can extract the clock information from the voltage modulated signal on the signal wire, which can be used for generating the current modulated signal.

For example, the host communication circuit is configured to generate the voltage modulated signal such that in each clock cycle of the reference clock signal a signal form of the voltage modulated signal is selected from one of the following: a sawtooth signal with a fast changing edge in the first period and a slow changing edge in the second period, or a signal having a peak pulse or spike pulse in the first period and a basically constant voltage in the second period. The selection may be performed permanently or based on a data signal. Furthermore, in some embodiments, the host communication circuit is configured to perform the voltage modulation with only one of the described signal forms, for example without being able to use the other signal form.

If a sawtooth signal is used, the sawtooth signal can have a fast rising edge and a slow falling edge or a slow rising edge and a fast falling edge. In any case, the slow changing edge generates only a DC current, parasitic capacitances of the signal wire assumed.

For the second signal form having the peak pulse or spike pulse in the first period, the constant or basically constant voltage in the second period has a constant zero voltage variation and thus generates no current on a signal wire, even if parasitic capacitances are present.

In various embodiments the host communication circuit is configured to demodulate the current modulated signal by generating a digital data signal based on the detection of one of two predetermined current levels within the current modulated signal. Such detection may include a subtraction of a DC current component generated by the voltage modulation, in particular during the second period.

As described above, further to the clock information, also data can be transmitted from the host communication circuit to the client communication circuit by means of the selection of a signal form. According to further additional or alternative implementations, further data can be transmitted from the host communication circuit to the client communication circuit.

For example, the host communication circuit is configured to generate the voltage change of the voltage modulated signal in the first period with one of at least two change amplitudes or voltage steps selected on the basis of a data signal. For example, one bit of information can be transmitted in each clock cycle, if one of two change amplitudes is selected. If three or more selectable change amplitudes or voltage steps are provided, further information bits can be coded within the voltage modulated signal.

According to further implementation forms, data can also be transmitted by selected a polarity of the voltage modulated signal. For example, the host communication circuit is configured to generate the voltage modulated signal such that it starts in the second period with one of two predetermined voltage levels selected on the basis of the data signal or a further data signal. For example, the respective selected signal form is virtually mirrored along a voltage level between the two predetermined voltage levels, which for instance can be detected by a connected client communication circuit.

An exemplary embodiment of a client communication circuit is adapted to be connected to a host communication circuit, for example according to one of the embodiments described above, by means of the single signal wire. The client communication circuit is configured to generate a sync signal with a respective sync pulse based on a detection of a significant voltage change, in particular a voltage step, a peak pulse, a spike pulse or the like, within a voltage modulated signal received via the signal wire from a connected host communication circuit. The client communication circuit generates a client clock signal based on the sync pulses of the sync signal, wherein the sync pulses determine a clock cycle of the reference clock signal of the connected host communication circuit. The client clock signal has a higher frequency than the sync signal and/or the respective reference clock signal at the host communication circuit. The client communication circuit is configured to perform a current modulation on the signal wire by generating a current modulated signal based on the client clock signal and on data to be transmitted from the client communication circuit to the connected host communication circuit. A current modulation based on the data to be transmitted is performed only after a predetermined settling time after one of the sync pulses until the respective following sync pulse, for each clock cycle of the reference clock signal, respectively the sync signal.

Hence, the client communication circuit waits until currents on the signal wire generated due to the voltage modulated signal, in particular the significant voltage change, are settled before starting to perform the current modulation.

In various implementation forms, the client communication circuit comprises a phase-locked loop circuit that is configured to generate the client clock signal using the sync signal as a reference.

According to further implementation forms, the client communication circuit is configured to generate the current modulated signal with one of two predetermined current levels for each clock cycle of the client clock signal based on digital data to be transmitted.

For example, the predetermined settling time is defined by a predetermined number of clock cycles of the client clock signal. Hence, during the predetermined number of clock cycles after one of the sync pulses, no current modulation is performed. The current modulation starts in the remaining clock cycles of the client clock signal within the longer clock cycle of the reference clock signal, respectively the sync signal.

In accordance with the time period for performing the current modulation, the host communication circuit may be configured to perform the demodulation of the current modulated signal only during a predetermined period of the clock cycle of the reference clock signal. In particular, the predetermined period may consist of a rear part of the second period.

In further implementation forms, the client communication circuit is configured to detect a signal form of the voltage modulated signal from one of the signal forms described above, in particular the sawtooth signal and the signal with the peak pulse or spike pulse and the basically constant voltage.

In further implementation forms, the client communication circuit is configured to detect a change amplitude in the first period of the voltage modulated signal and to generate a data signal based on the detection. For example, the client communication circuit is configured to detect at least two different change amplitudes or voltage steps, for example corresponding to a single bit information. To this end, the client communication circuit may comprise a comparator with one or more comparator levels, the number of comparator levels depending on the number of different change amplitudes to be detected.

In further implementation forms, the client communication circuit is configured to detect with which one of two predetermined voltage levels the voltage modulated signal starts in the second period and to generate a data signal based on the detection.

For each of the above-described detections, separately or in combination, a data signal can be generated based on the detection result within the client communication circuit. For example with two different signal forms, two different change amplitudes and two different starting voltage levels, anything between three independent data bits and a three-bit symbol with eight states can be transmitted in each clock period of the reference clock signal from the host communication circuit to the client communication circuit.

With a combination of the various embodiments of the host communication circuit and the client communication circuit described above, a communication system can be formed in which the host communication circuit and the client communication circuit are connected to each other by means of the single signal wire.

The different levels needed for the voltage modulation and the current modulation may be preset in the respective communication circuits. However, the respective levels may also be set during a level adaptation or calibration phase, for example after startup or connection of the two communication circuits.

For example, in the communication system, the host communication circuit and the client communication circuit are configured to perform a level adaptation that determines a minimum amplitude of the voltage change in the first period of the voltage modulated signal, and a minimum amplitude of a current change in the current modulated signal.

For example, in order to determine the minimum amplitude of the voltage change, the host communication circuit is configured to generate the voltage change with a selected change amplitude, the client communication circuit is configured to determine whether the selected change amplitude is detectable, and to return respective information to the host communication circuit by means of the current modulated signal. Accordingly, the host communication circuit is configured to gradually reduce the selected change amplitude until it is not detectable by the client communication circuit. Preferably, the last detectable change amplitude is chosen for operation of the host communication circuit.

In order to determine the minimum amplitude of the current change, for example, the client communication circuit is configured to generate the current modulated signal with a current change with a selected change amplitude, the host communication circuit is configured to determine whether the selected change amplitude is detectable and to return respective information to the client communication circuit by means of the voltage modulated signal. Accordingly, the client communication circuit is configured to gradually reduce the selected change amplitude until it is not detectable by the host communication circuit. Preferably, the last detectable current change amplitude is selected or used as a basis for current modulation by the client communication circuit.

E.g., for the level adaptation, in a first step the voltage change amplitude is determined, and after the operational voltage change amplitude is found, in a second step the current change amplitude is determined. This order may be preferable because the selection of the voltage level has a higher influence on the current modulation than the current change level on the voltage modulation.

In various embodiments the client communication circuit is configured to extract its power supply from the signal wire, in particular without influencing the frequency ranges used for communication.

In the following, an exemplary embodiment of a method for communication between a host side and a client side, which are connected to each other by means of a single signal wire, is described. In this embodiment, on the host side a voltage modulation on the signal wire is performed by generating a voltage modulated signal based on a reference clock signal. In particular on the host side, in the first period of a clock cycle of the reference clock signal, the voltage modulated signal is generated with a significant voltage change, in particular a voltage step, a peak pulse, a spike pulse or the like, based on a clock edge of the reference clock signal. Furthermore on the host side, in a second period of the clock cycle, the voltage modulated signal is generated with a basically constant voltage variation, wherein the first period is significantly shorter than the second period. On the client side, a sync signal is generated with a respective sync pulse based on a detection of the significant voltage change. Furthermore on the client side, a client clock signal is generated based on the sync pulses of the sync signal, wherein the client clock signal has a higher frequency than the sync signal, respectively the reference clock signal. Furthermore, on the client side, a current modulation is performed on the signal wire by generating a current modulated signal based on the client clock signal and on data to be transmitted from the client side to the host side. A current modulation based on the data to be transmitted is performed only after a predetermined settling time after one of the sync pulses until the respective following sync pulse, for each clock cycle of the reference clock signal, respectively the sync signal. On the host side, the current modulated signal is demodulated, for example in order to restore the data to be applied to the host electronic.

In one implementation form of the method, on the host side the voltage change of the voltage modulated signal is generated in the first period with one of at least two change amplitudes selected on the basis of a data signal. Accordingly, on the client side, the selected change amplitude is determined within the voltage modulated signal and the data signal is reconstructed based on the determined change amplitude.

Further embodiments and implementation forms of the communication method become apparent from the various embodiments of the host communication circuit, the client communication circuit and the communication system described above. In particular, such implementations include the described selection of voltage levels, current levels, signal forms, polarities and respective detection methods described above.

The host communication circuit may, for example, be implemented within a mobile device, to which various kinds of periphery can be connected. For example, such periphery may contain one of the implementation forms of the client communication circuit. The periphery may be a headset with or without microphones, or the like, which return any kind of data to the mobile device. For example, the single signal wire may be a wire that connects the periphery, in particular a headset to the mobile device by a conventional headphone jack like a 3.5 mm jack.

BRIEF DESCRIPTION OF THE DRAWINGS

In the drawings:

FIG. 13 shows an exemplary signal time diagram within a communication system according to FIG. 12.

DETAILED DESCRIPTION

The text below explains the invention in detail using exemplary embodiments with references to the drawings.

Same references are used for same elements or circuit parts, or elements of circuit parts having a similar function in the various figures. Hence, the description of elements of circuit parts in one figure may not be repeated in the following figures.

Figure 1:
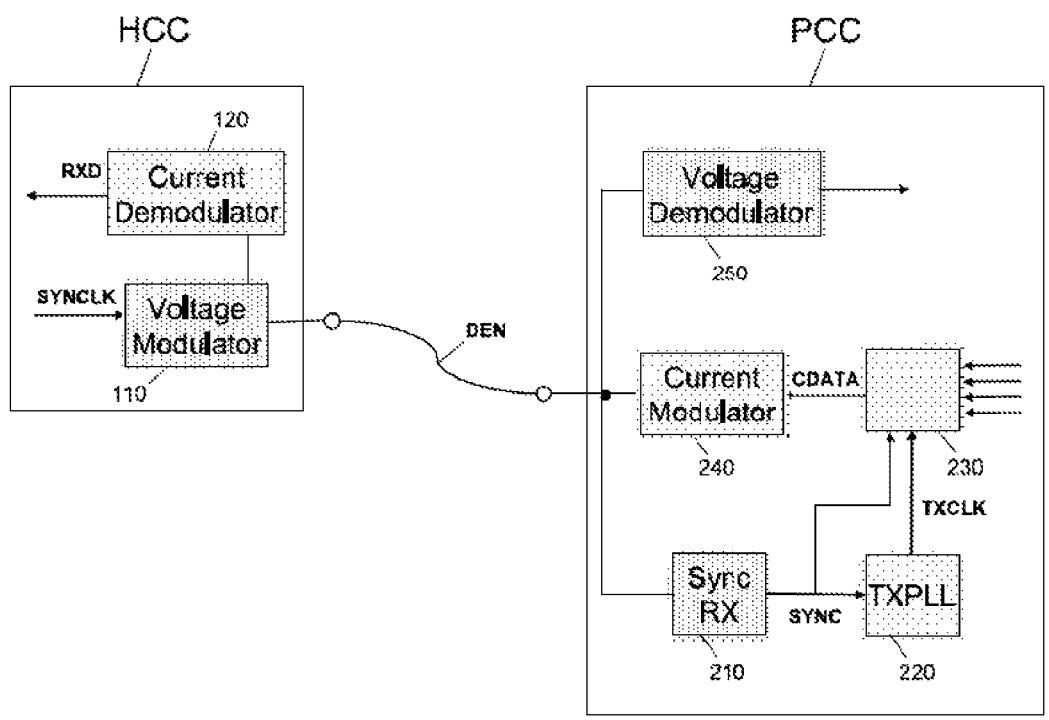
FIG. 1 shows an embodiment of a communication system.

FIG. 1 shows an exemplary embodiment of a communication system according to the efficient communication concept that comprises a host communication circuit HCC and a client communication circuit PCC. The two communication circuits HCC, PCC are connected to each other by means of a data exchange node DEN, which for example, comprises a single signal wire and possibly a reference wire for having a common reference potential or ground potential.

The host communication circuit HCC comprises a voltage modulator 110, which on its output side is coupled to the data exchange node DEN and which has an input for receiving a reference clock signal SYNCLK that may be provided by an internal oscillator or the like. The host communication circuit HCC further comprises a current demodulator 120 which is also coupled to the data exchange node DEN by means of the voltage modulator 110. On its output side the current demodulator 120 provides a receiver data signal RXD.

The client communication circuit PCC comprises a synchronization receiver 210, a current modulator 240 and a voltage demodulator 250, which are each coupled to the data exchange node DEN. The synchronization receiver 210 provides at its output side a sync signal SYNC which is provided to a clock generation circuit 220. The clock generation circuit 220 for example comprises a phase-locked loop, PLL, circuit TXPLL that is configured to generate a client clock signal TXCLK using the sync signal SYNC as a reference. The client communication circuit PCC further comprises a serializer block 230 that on its input side receives data to be transmitted to the host communication circuit HCC, for example in parallel form, and that is adapted to generate a serial bit stream CDATA based on the input data and the client clock signal TXCLK. The generation of the serial bit stream CDATA is further based on the sync signal SYNC.

The serial bit stream CDATA is provided to the current modulator 240 that is configured to perform a current modulation on the data exchange node DEN based on the serial bit stream CDATA.

The voltage demodulator 250, which is an optional block, is configured to perform a voltage demodulation of a voltage modulated signal on the data exchange node DEN, which will be explained in more detail below. For example, the voltage demodulator 250 extracts upstream data sent from the host communication circuit HCC by means of the voltage demodulation.

During operation of the communication system, the host communication circuit HCC performs a voltage modulation and the client communication circuit PCC performs a current modulation on the same data exchange node, respectively signal wire, DEN. In order to reduce an influence of a respective voltage modulated signal on the current modulation, the host communication circuit respectively the voltage modulator 110, according to the efficient concept, use a selected signal form for the voltage modulated signal, which is applied in each clock cycle of the reference clock signal SYNCLK. In particular, during a first period of a clock cycle of the reference clock signal SYNCLK, the voltage modulated signal is generated with a significant voltage change, for example a voltage step, a peak pulse, a spike pulse or the like, that is based on a clock edge of the reference clock signal SYNCLK. In particular, only a rising clock edge or only a falling clock edge of the reference clock signal SYNCLK is used to trigger the generation of the significant voltage change. In a second period of the clock cycle, the voltage modulated signal is generated with a constant or physically constant voltage variation or voltage gradient, respectively. Therein, the first period is significantly shorter than the second period. Preferably, the first and the second period together form a complete clock cycle of the reference clock signal SYNCLK.

Figure 2A:
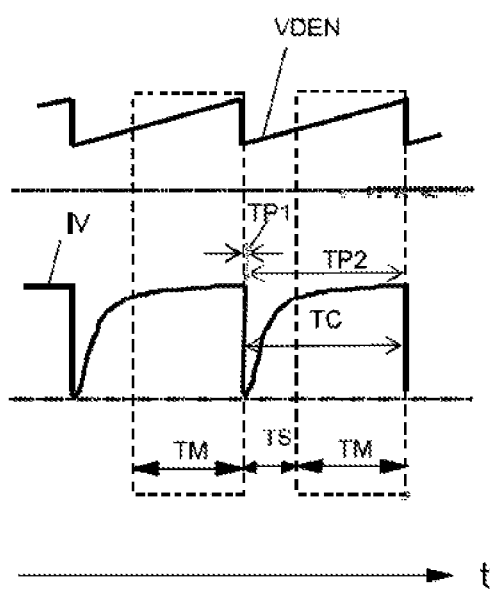
FIG. 2A and FIG. 2B show signal time diagrams of a voltage modulated signal.
Figure 2B:
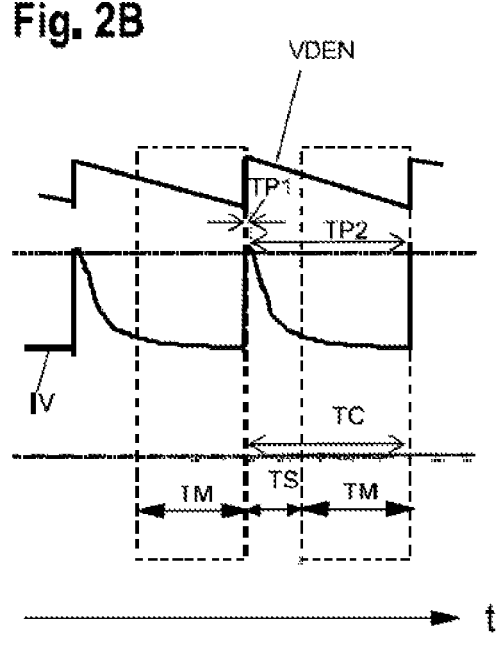

Referring to the signal time diagrams in FIG. 2A and FIG. 2B, possible implementations of the selected signal form are shown. In each case, a voltage modulated signal VDEN is a sawtooth signal, wherein in FIG. 2A the sawtooth signal has a slow rising edge and a fast falling edge, and wherein in FIG. 2B the sawtooth signal has a fast rising edge and a slow falling edge. As can be seen from FIG. 2A and FIG. 2B, the fast changing edge falls into a first period TP1 of a clock cycle TC, whereas the slow changing edge of the voltage modulated signal VDEN falls in the second period TP2.

It is well known that signal wires can have parasitic capacitances. Hence, the respective voltage gradient dV/dt of the voltage modulated signal VDEN may generate a current on the signal wire based on such parasitic capacitances that depends on a value of the voltage variation or gradient dV/dt at each time. Such a resulting current is shown as current IV in FIG. 2A and FIG. 2B. In both figures, the fast changing edge of the sawtooth signal generates a spike in the resulting current IV being negative in FIG. 2A and being positive in FIG. 2B. In each case, the spike settles to a basically constant value. Furthermore, during the slow changing edge of the sawtooth signal in the second period TP2, a voltage gradient dV/dt has a basically constant positive or negative value that generates the DC current within the resulting current IV.

Hence in each clock cycle TC a settling time or settling period TS and a modulation time or modulation period TM can be defined, which are shown as well in FIG. 2A as in FIG. 2B.

Referring back to FIG. 1, the client communication circuit PCC is able to detect the significant voltage change by means of the synchronization receiver 210 and to generate respective sync pulses within the sync signal SYNC. Furthermore, based on the sync signal SYNC, respectively the comprised sync pulses, and on a predetermined settling time TS, a current modulation is only performed after the predetermined settling time TS after one of the sync pulses until the respective following sync pulse, or in other words, during the modulation time TM. For example, the serializer block 230 generates the serial bit stream CDATA such that only during the modulation time TM the respective data to be transmitted are formed into the bit stream CDATA. Hence, the current modulator 240 performs the current modulation on the data exchange node DEN only during the modulation time TM.

The current demodulator 120 within the host communication circuit HCC is configured to perform a demodulation of the current modulated signal, which will be explained as an example in more detail below.

It should be noted that signal forms other than a sawtooth signal can be used for the voltage modulation that have a significant, preferably short, voltage change in a first period TP1 and a basically constant voltage variation in a second period TP2.

Figure 3:
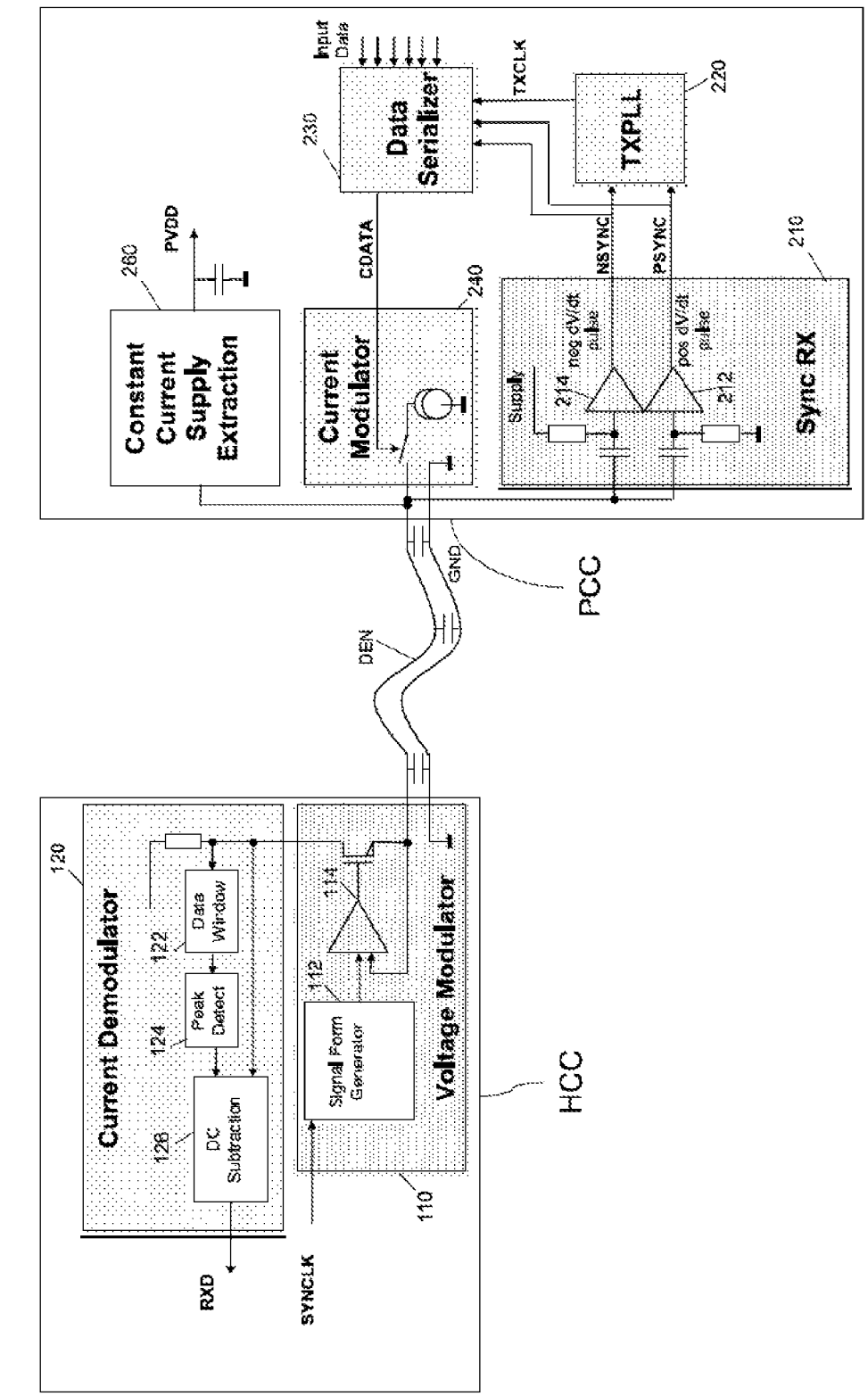
FIG. 3 shows a further embodiment of a communication system.

FIG. 3 shows a more detailed implementation form of a communication system with a host communication circuit HCC and a client communication circuit PCC, based on the embodiment of FIG. 1. For example, the voltage modulator 110 comprises a signal form generator 112 that has the reference clock signal SYNCLK as its input. An output of the signal form generator 112 is connected to an amplifier 114 controlling an output transistor and having a feedback from an output terminal connected to the data exchange node DEN or signal wire. Accordingly, the voltage on the signal wire DEN follows the signal form being output by the signal form generator 112. For example, the signal form generator 112 generates a sawtooth signal according to FIG. 2A or FIG. 2B or another signal form as described above.

In the embodiment of FIG. 3, the data exchange node DEN comprises a single signal wire, which is shown with parasitic capacitances being applicable against a common reference potential or ground potential GND.

The synchronization receiver 210 comprises two pulse detectors 212, 214, which each comprise a buffer, a capacitive element and a resistive element. The pulse detector 212 is configured to detect the significant positive voltage change determined by a high positive voltage gradient dV/dt, which generates a corresponding positive sync signal PSYNC. In a similar fashion, the pulse detector 214 is configured to detect a significant negative voltage change within the voltage modulated signal with a high negative voltage gradient dV/dt, which generates a negative sync signal NSYNC. The PLL circuit TXPLL 220 is configured to generate the client clock signal TXCLK on the basis of one or two of the sync signals NSYNC, PSYNC. Furthermore, the sync signals NSYNC, PSYNC are provided to the serializer block 230.

As described before in the embodiment of FIG. 1, the current modulator 240 generates the current modulated signal on the signal wire DEN based on the serial bit stream CDATA. The current modulated signal is demodulated by the current demodulator 120 within the host communication circuit. To this end, the current demodulator 120 comprises a windowing block 122, a peak detection block 124 and a DC subtraction block 126. An input of the windowing block 122 is connected to the transistor of the voltage modulator 110. The windowing block 122 is configured to let the current demodulation only be performed during the modulation time TM inside the current demodulator 120. The current of the current modulated signal is transferred into a voltage by a shunt resistor, which for instance is shown inside block 120. Preferably, data of the current modulation is processed in a way that there is at least one logical one and at least one logical zero in each data frame, i.e. during each modulation time. By that the peak detector 124, which can be used to define the comparator threshold of the demodulator circuit, gets updated in each data frame respectively during each modulation time TM.

As described before, the slow and constant voltage variation for the majority of time duration, mainly the second period TP2, with a constant voltage gradient dV/dt, gives a constant current into the parasitic capacitances, which results in that these parasitic capacitances just add a DC component to the current, which can easily subtracted in the DC subtraction block 126 of the current demodulator 120.

If a signal form as in FIG. 2A with a fast falling edge and a slow rising edge is used, the sign of the resulting current does not influence the operation of the peak detector 124, which is configured to detect a positive current peak. If a signal form according to FIG. 2B with a fast rising edge is used, it may be desirable to mask the peak detector 124 during the rising edge, respectively, the first period TP1. As an alternative, the peak detector 124 is configured to detect a negative current peak.

In the embodiment of FIG. 3, the client communication circuit PCC comprises an optional constant current supply extraction block 260, which is configured to generate a supply voltage PVDD for circuits on the client side. For example, block 260 is configured to extract power supply for the client communication circuit PCC from the signal wire DEN without influencing the frequency ranges used for communication.

It should be noted that the synchronization receiver 210 may comprise only one of the pulse detectors, in particular if it is known in advance that only voltage changes or pulses of one polarity will be present in the voltage modulated signal.

Figure 4A:
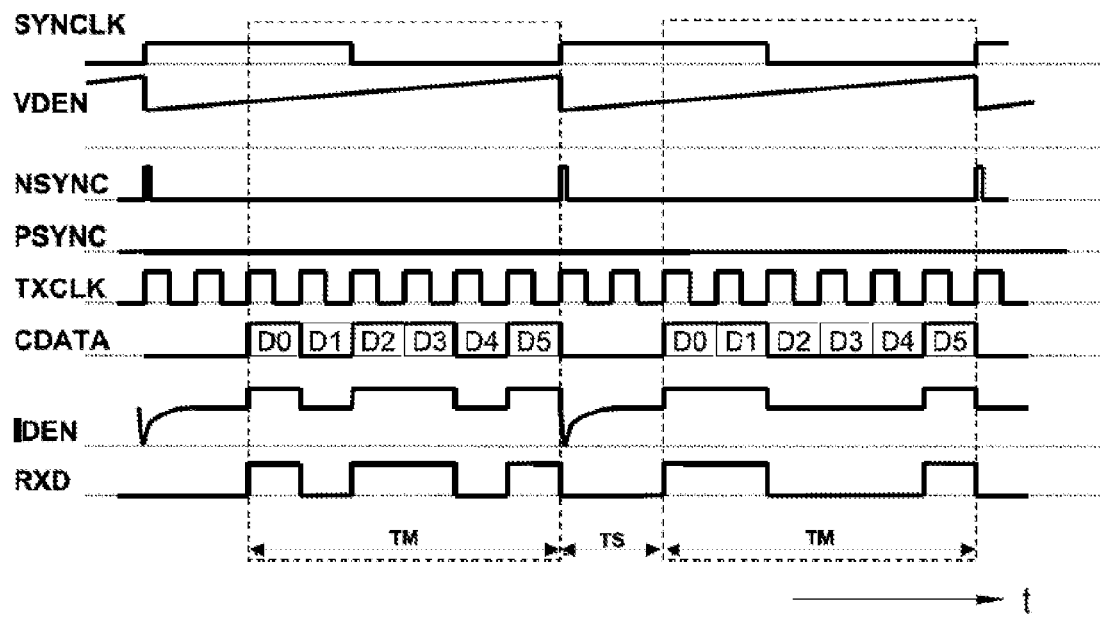
FIG. 4A and FIG. 4B show exemplary signal time diagrams of signals within the communication system of FIG. 3.
Figure 4B:
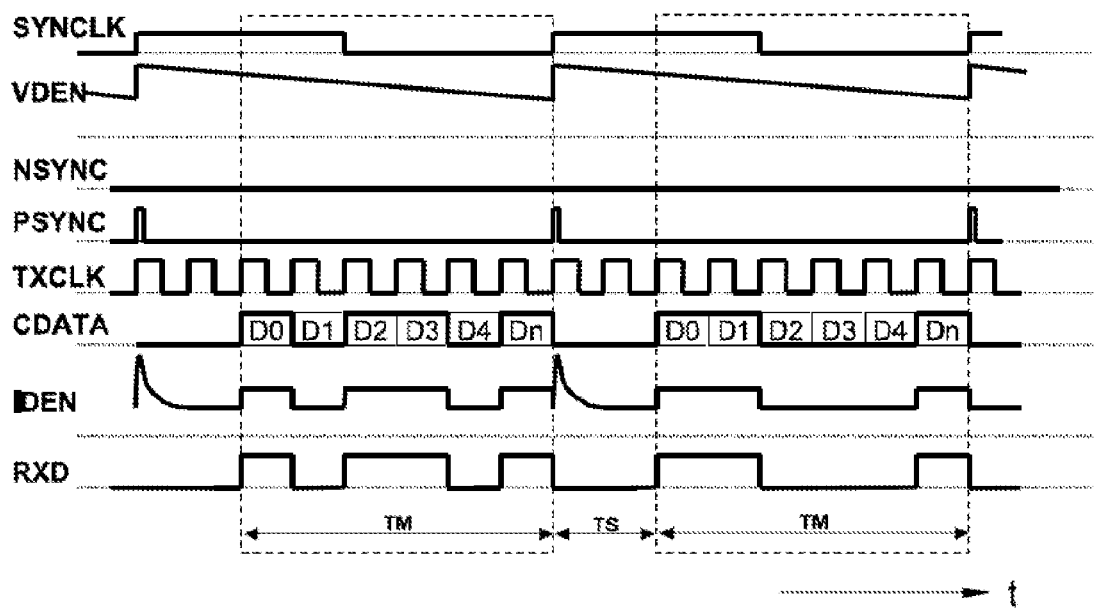

FIG. 4A and FIG. 4B show exemplary signal time diagrams of signals possibly being present during operation of the communication system according to the embodiment of FIG. 3. In particular, FIG. 4A shows signals with a voltage modulated signal VDEN according to FIG. 2A, whereas FIG. 4B shows signals with a voltage modulated signal VDEN according to FIG. 2B. In each case, a fast changing edge of the sawtooth signal VDEN is triggered by a rising edge of the reference clock signal SYNCLK.

Referring to FIG. 4A, the synchronization receiver 210 generates the negative sync signal NSYNC with respective sync pulses at the fast falling edges of the voltage modulated signal VDEN, whereas no sync pulses are generated in the positive sync signal PSYNC.

In a complementary fashion, referring to FIG. 4B, the synchronization receiver 210 generates no sync pulses for the negative sync signal NSYNC but only positive sync pulses within the positive sync signal PSYNC in response to the detection of the fast rising edge of the voltage modulated signal VDEN.

In both cases of FIG. 4A and FIG. 4B the PLL circuit TXPLL 220 generates a client clock signal TXCLK based on the sync pulses of the negative sync signal NSYNC, respectively the positive sync signal PSYNC, both having a higher frequency than the reference clock signal SYNCLK. In particular, a frequency of the client reference clock TXCLK is eight times higher than the frequency of the reference clock signal SYNCLK in these exemplary embodiments.

Based on the client clock signal TXCLK the serializer block 230 generates the serial bit stream CDATA with one bit per clock period of the client clock signal TXCLK. However, generation of the serial bit stream is only performed in the last six client clock periods constituting the modulation time TM, but not in the first two client clock periods constituting the settling time TS. Accordingly, the current response to the significant voltage change of the voltage modulated signal VDEN on the current modulated signal IDEN is settled, such that during the modulation time TM the current modulated signal IDEN can be transmitted without significant disturbances.

Accordingly, the current demodulator 120 can generate the receiver data signal RXD from the demodulation of the current modulated signal IDEN during the modulation time TM.

As can be seen from FIG. 4A and FIG. 4B, the fast transient of the voltage modulated signal VDEN allows the extraction of a frame synchronization signal transmitted from the host communication circuit HCC with a high precision. This synchronization signal can be used by the PLL circuit TXPLL 220 to generate a synchronized clock signal with a multiple frequency for sending data bits of data to be transmitted in a serial way in a current modulation.

It should be noted that the frequency ratio of 8 is chosen only for exemplary reasons but could be chosen to be higher or lower according to the desired application. According to the embodiments described in conjunction with FIG. 4A and FIG. 4B, the information that is transmitted from the host side to the client side of the communication system is the synchronization of the reference clock signal SYNCLK. However, by further varying the signal form of the voltage modulated signal VDEN, also additional information can be transmitted from the host side to the client side. For example, various combinations of a variation of a change amplitude of the significant change, a polarity of the voltage modulated signal and the selection of a specific signal form can be used combined or separately to transmit further information.

This will be described below with reference to the specific signal forms taken alone, which however can be combined as desired within a specific application.

Figure 5:
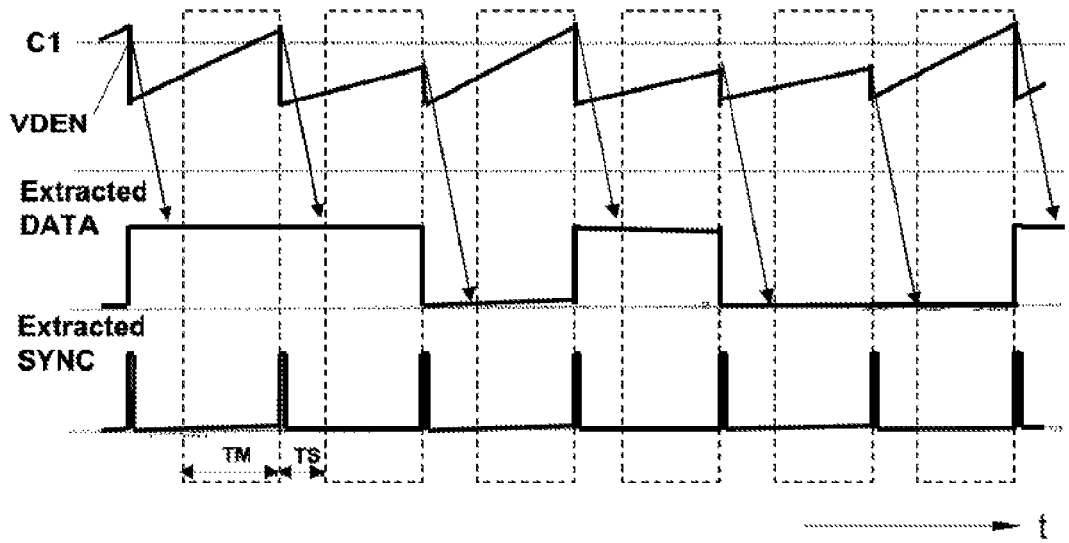
FIG. 5 shows an exemplary signal time diagram of signals within an embodiment of a communication system.

For example, FIG. 5 shows a signal time diagram comprising a voltage modulated signal VDEN having a sawtooth signal form and using amplitude shift keying, ASK, for encoding information. In particular, the voltage modulated signal VDEN in FIG. 5 is a sawtooth signal with a slow rising edge and a fast falling edge, wherein a maximum amplitude and therefore a change amplitude or voltage step of the fast changing edge is selected between two different amplitudes or levels being distinct from zero. As in the previous embodiments, the steep edge of the sawtooth signal is used to generate respective sync pulses within the sync signal SYNC. Furthermore, the change amplitude or amplitude of the voltage step determines one of two possible states of an Extracted DATA signal. For example, in this embodiment, a voltage step being higher than a comparator level C1 results in a high state of the Extracted DATA signal, whereas a voltage step being lower than the comparator level C1 results in a low state of the Extracted DATA signal. Hence, for each clock cycle of the reference clock signal SYNCLK one data bit is transmitted from the host side to the client side. For example, the client communication circuit PCC comprises the voltage demodulator 250 shown in FIG. 1, which includes a comparator employing the comparator level C1 in order to generate the Extracted DATA signal. The comparator stage can be used to demodulate the ASK signal by comparing the voltage relative to a fixed or adaptive threshold or the comparator stage can be used to determine the ASK data by comparing the dV/dt of the slow edge of the sawtooth to a fixed or adaptive threshold.

It should be noted that the downstream current modulation is also performed during the modulation time TM, which in particular is possible with low modulation current since the different voltage step amplitudes have low influence to the current modulation outside the settling time TS. Respective signals associated with the current modulation are not shown in FIG. 5 for reasons of a better overview only.

On the host side, the respective functionality for generating the voltage modulated signal VDEN with different voltage step amplitudes may be located within the signal form generator 112, or more generally spoken, within the voltage modulator 110.

In a further embodiment, as an alternative or in addition, the host communication circuit is configured to generate the voltage modulated signal VDEN such that it changes the polarity of the modulated voltage shape in order to increase the transferred information. For example in case of a sawtooth signal, there are shapes with fast rising edges with two different amplitudes and shapes with fast falling edges with two different amplitudes to represent four different states. This is shown as an example in the signal time diagram of FIG. 6. Herein, the voltage modulated signal VDEN changes its signal form from a sawtooth signal with a slow rising edge in the first three fully shown clock periods to a sawtooth signal with a slow falling edge in the last three fully shown clock cycles of the reference clock signal SYNCLK. In particular, the slow rising edge starts at a first voltage level VL1 in each case wherein, as in the embodiment of FIG. 5, two different voltage step amplitudes can be selected for the voltage modulated signal VDEN. Hence, as in the embodiment of FIG. 5, the different voltage step amplitudes result in the Extracted DATA signal. In the clock periods with the slow falling edge, the signal starts at a second voltage level VL2, again with two possible voltage step amplitudes resulting in the Extracted DATA signal.

With reference to the embodiments of FIG. 4A and FIG. 4B, the fast falling edges of the voltage modulated signal VDEN result in negative pulses in the negative sync signal NSYNC, whereas the fast rising edges result in sync pulses within the positive sync signal PSYNC. Furthermore, from the kind of sync pulses, namely positive or negative, a further information can be extracted on the client side. Taken as an example in FIG. 6, a block clock BCLK is generated, which may distinguish the Extracted DATA signal between left channel data and right channel data for audio data. In this case, the block clock BCLK can also be called a left right clock. As an alternative to the deriving the block clock from the sync signals NSYNC, PSYNC, also the voltage gradient dV/dt of the slow edge can be measured to derive the block clock BCLK at the client side.

In a further embodiment, which is based on the embodiment of FIG. 5, three or more change amplitudes or voltage step amplitudes can be used for transmitting information from the host side to the client side. The signal time diagram of FIG. 7 shows an example of such an embodiment, wherein three different voltage step amplitudes are used. As can be seen from FIG. 7 the voltage modulated signal VDEN is a sawtooth signal with a slow rising edge and a fast falling edge. A small and a medium voltage step amplitude are used to carry a low state or a high state information, respectively. The respective voltage steps generate pulses in sync signal DSYNC. A high voltage step amplitude results in a pulse within a block clock sync signal BCSYNC. If such a pulse in the signal BCSYNC occurs, the block clock signal BCLK changes its state, here from a high state to a low state, as an example. Hence, similar to the embodiment of FIG. 6, a block clock information can be transmitted from the host side to the client side by means of the additional ASK modulation of the voltage modulated signal VDEN. More generally spoken, with the third voltage step amplitude, a data transmission rate for upstream-data can be increased by 50%.

In a further embodiment, the host communication circuit is configured to generate the voltage modulated signal with a different signal form, in particular different from a sawtooth signal form. For example, a significant voltage change consists in a peak pulse or a spike pulse or the like, which is present during the first period TP1, while in the second period TP2, the voltage modulated signal VDEN has a constant or basically constant voltage level.

Figure 8:
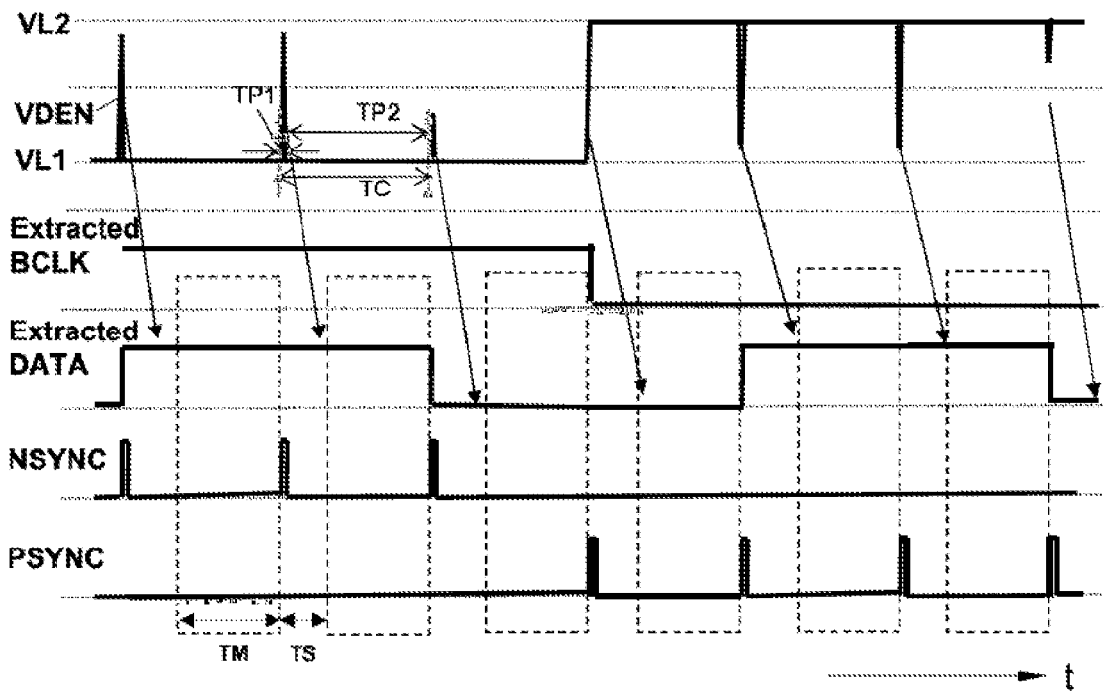
FIG. 8 shows an exemplary signal time diagram of signals within a further embodiment of a communication system.

FIG. 8 shows an exemplary signal time diagram of an embodiment that uses a voltage modulated signal VDEN with peak pulses or spike pulses in the first period TP1. Similar as for the sawtooth signal, the peak pulse generates a current peak due to parasitic capacitances on the signal wire DEN during the first period TP1, which however settle until the end of the settling time TS. Hence, during the modulation time TM no further influence from the voltage modulated signal VDEN on the current modulated signal IDEN is present, in particular as the voltage gradient dV/dt of the voltage modulated signal VDEN is zero or basically zero due to its constant voltage level.

Figure 6:
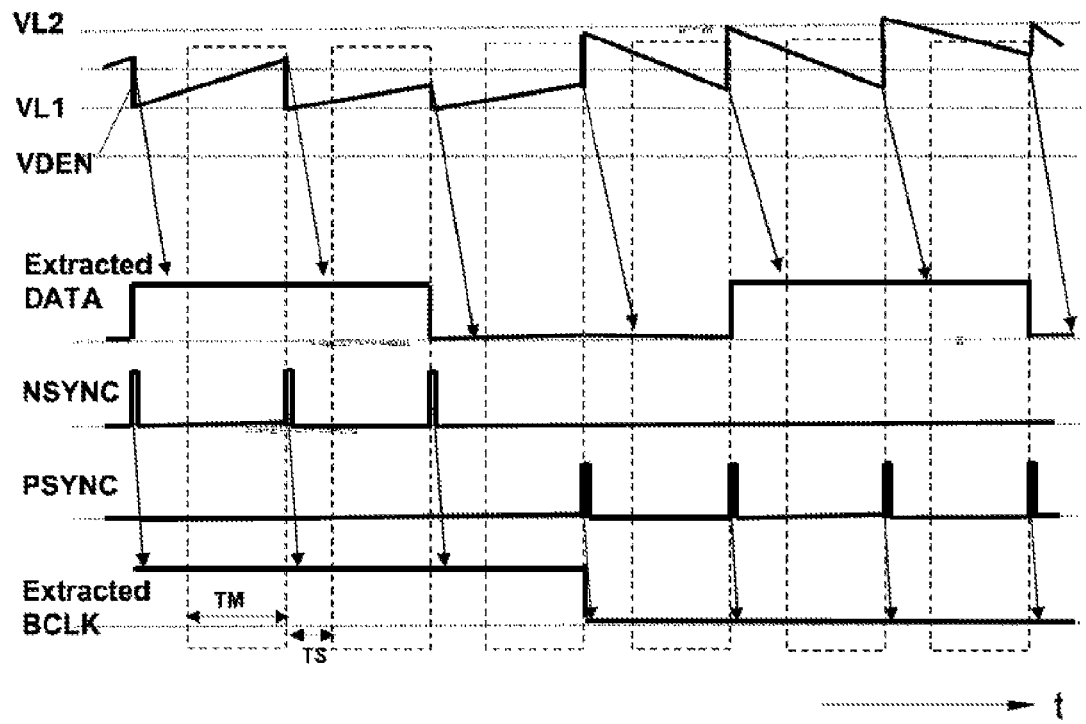
FIG. 6 shows an exemplary signal time diagram of signals within a further embodiment of a communication system.
Figure 7:
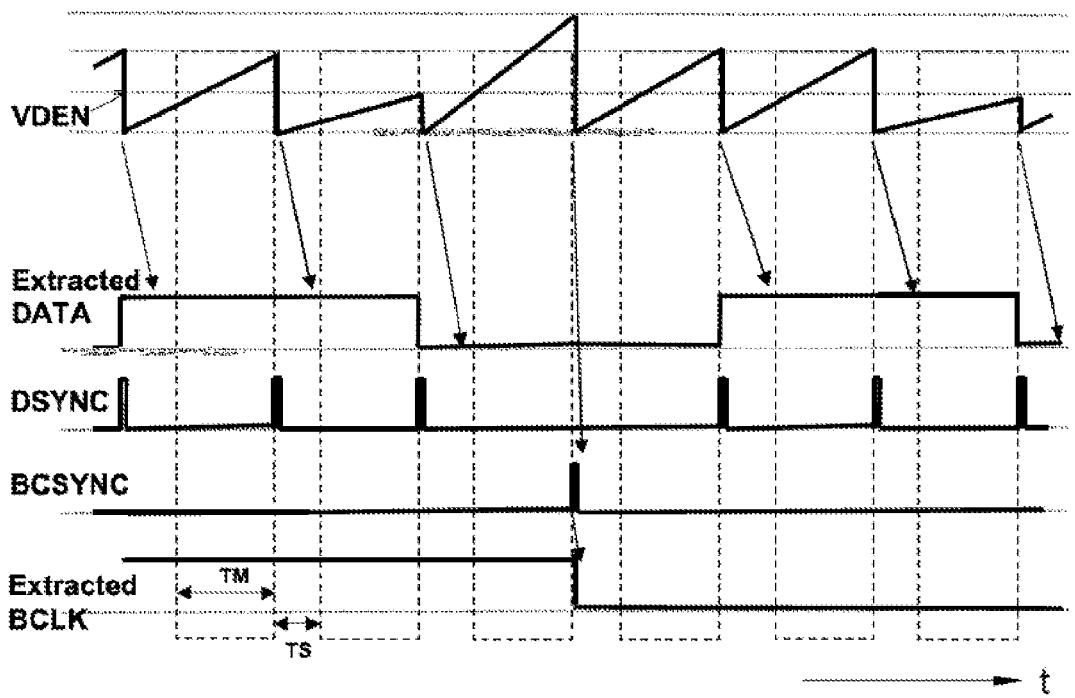
FIG. 7 shows an exemplary signal time diagram of signals within a further embodiment of a communication system.

In the embodiment of FIG. 8 that constant voltage level is either a first voltage level VL1, or a second voltage level VL2, similar to the embodiment of FIG. 6. However, if only the synchronization information is to be transmitted to the client side, only one polarity with only one modulation amplitude of the voltage modulated signal VDEN is sufficient.

However, with the two voltage levels VL1, VL2, a block clock BCLK can be extracted at the client side similar to the embodiments described above. Furthermore, different amplitudes or heights of the peak pulses can determine the level of an Extracted DATA signal, namely a high level or a low level depending on the change amplitude respectively the ASK voltage. Furthermore, peak pulses starting from the first voltage level VL1 generate a pulse in the negative sync signal NSYNC, while peak pulses starting from the second voltage level VL2 generate pulses in the positive sync signal PSYNC.

For example, the peak pulses may be generated using the signal form generator 112. It should be noted that further signal forms besides the peak pulses or spike pulses and sawtooth signal may be used.

The signal form may be preset or hard-coded in the host communication circuit HCC and/or the client communication circuit PCC, such that only the selected signal form is used for the voltage modulation. However, the host communication circuit HCC may be configured to select one of the signal forms based on a data signal, such that in each clock cycle of the reference clock signal SYNCLK a different signal form may be used.

The application of different voltage levels and polarities is not effected by the selection of the signal form.

Figure 9:
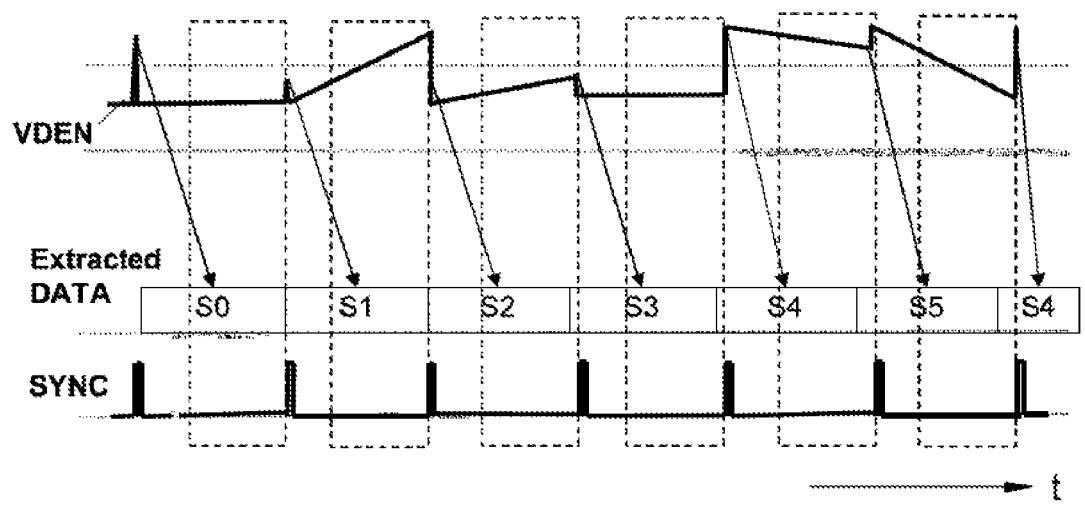
FIG. 9 shows an exemplary signal time diagram of signals within a further embodiment of a communication system.

FIG. 9 shows a signal time diagram of an exemplary embodiment which combines the above-described variations to the signal generation of the voltage modulated signal VDEN. The signal VDEN shown in FIG. 9 is only chosen as an example and does not employ all possible combinations of signal variations. In any case, for each of the significant voltage changes a pulse in the sync signal SYNC is generated. A high peak pulse starting from a low level may be mapped to a data symbol S0, a small peak pulse starting from the low level may be mapped to a symbol S1, a fast falling edge to a low level with a high voltage step amplitude may be mapped to a symbol S2, a fast falling edge of a sawtooth signal to a low level with a small voltage step amplitude may be mapped to a symbol S3, etc. For example, by the two different signal forms, the two different voltage step amplitudes and the two different voltage levels, at which the second period TP2 starts, a total of eight possible different symbols can be generated in each clock cycle.

Figure 10:
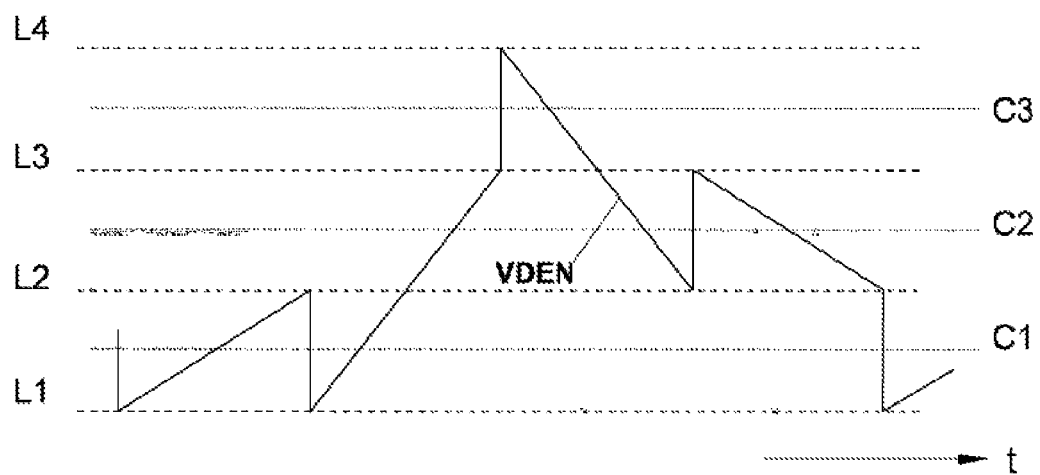
FIG. 10 shows an exemplary signal time diagram of signals within a further embodiment of a communication system.

FIG. 10 shows a further embodiment of a voltage modulated signal VDEN which employs four different signal levels L1, L2, L3, L4, combined with slow rising and falling ramps to increase the data transfer rate. To detect the different voltage levels, three different comparator levels C1, C2, C3 at the client side are present for detection.

In various applications of the communication system, the host communication circuit HCC may be comprised by a mobile device like a mobile phone, a tablet PC, a pad, a music player or the like, to which a peripheral like a headset, a microphone, a headset with microphone, any sensor or the like, may be connected.

Figure 11:
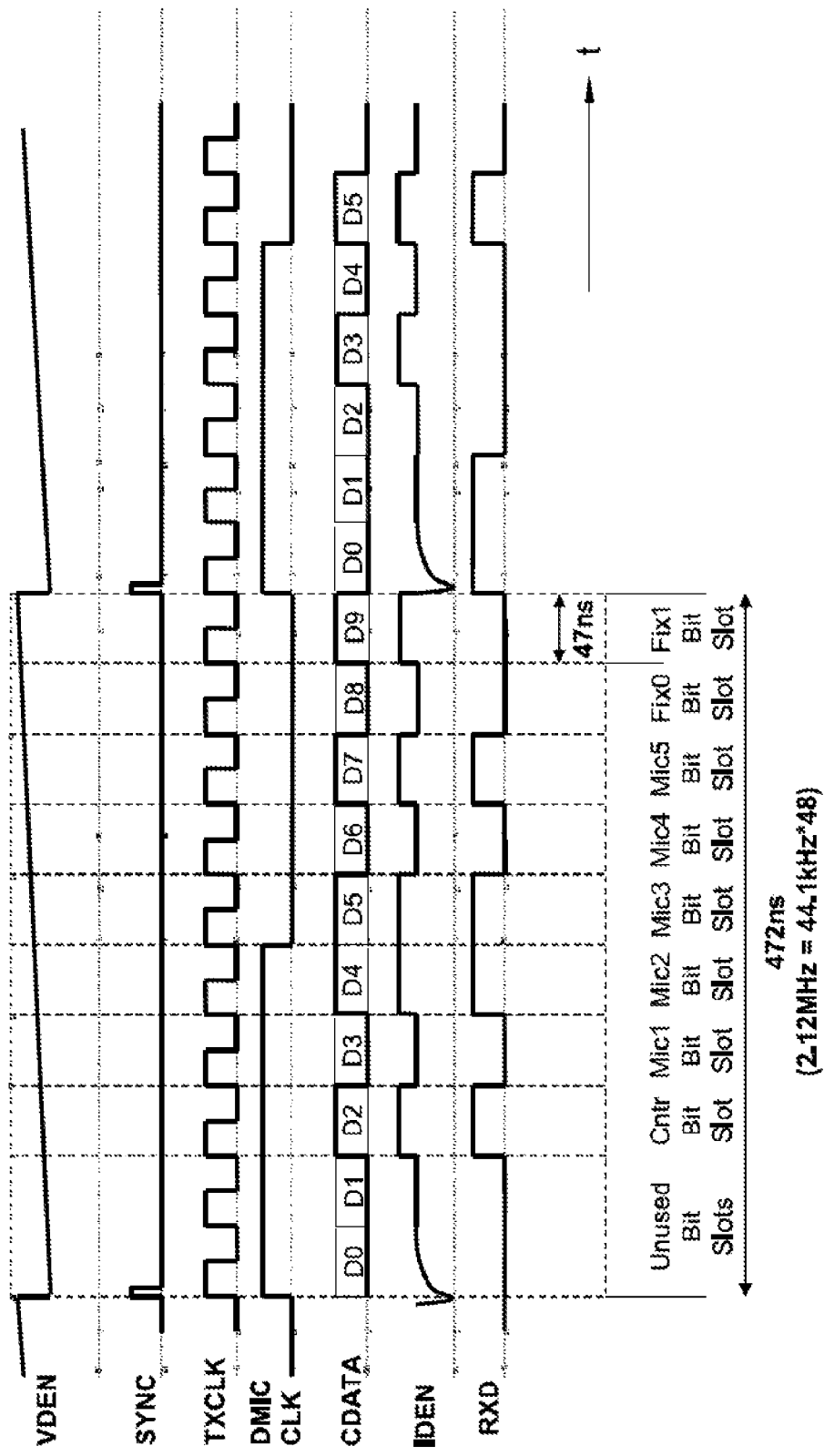
FIG. 11 shows an exemplary signal time diagram of signals within a further embodiment of a communication system.

FIG. 11 shows an exemplary signal time diagram of signals within an embodiment of a communication system, which may employ the host communication circuit HCC within such a mobile device and the client communication circuit PCC within a headset configured for active noise cancellation. For example, the headset is connected to the mobile device by means of a regular well known 3.5 mm headphone jack, which has a ground wire, two analog signal wires for transmitting audio signals to the headset and a fourth signal wire for other information such as a microphone supply and signal line. In particular the fourth wire may be the single signal wire DEN connecting the communication circuits HCC, PCC.

FIG. 11 shows only one full clock cycle of the reference signal SYNCLK, which however is sufficient to explain the various data to be transmitted. In this embodiment, the voltage modulated signal VDEN is a sawtooth signal with a slow rising edge and a fast falling edge, which generates respective pulses in the sync signal SYNC at the client side. On the client side, the client clock signal TXCLK is generated with a frequency multiplier of value ten, for example by means of a PLL circuit as described above. Furthermore, a reference clock signal for an analog-to-digital converter inside of digital microphones of the headset is generated. This clock signal DMIC CLK has the same frequency or clock cycle as the reference clock signal SYNCLK.

Due to the frequency ratio of 10:1 between the client clock signal TCLK and the reference clock signal VDEN, ten data slots are available for data transmission from the client side to the host side. The first two slots D0, D1 might be unused, as shown for instance in FIG. 11, representing the settling time TS, leaving eight slots for data downstream transmission represented in the modulation time TM.

For example, the headset comprises five digital microphones and a push button, the information of which is to be transmitted to the host side. In this exemplary embodiment, slot D2 is used for transmitting control data of the push button. The slot D2 can also be used for transmitting an ID code, calibration data or the like, to the host side. Slots D3, D4, D5, D6, D7 are used for one bit of each of the five microphones, and the slots D8, D9 are used with fixed content to have a measure if the data transfer is locked or not. It should be noted that the analog-to-digital converter of the digital microphones works with the lower frequency of the reference clock signal SYNCLK, respectively the microphone clock signal DMIC CLK, such that a time multiplex of the microphone data is performed in each clock period of the reference clock signal SYNCLK.

Figure 12:
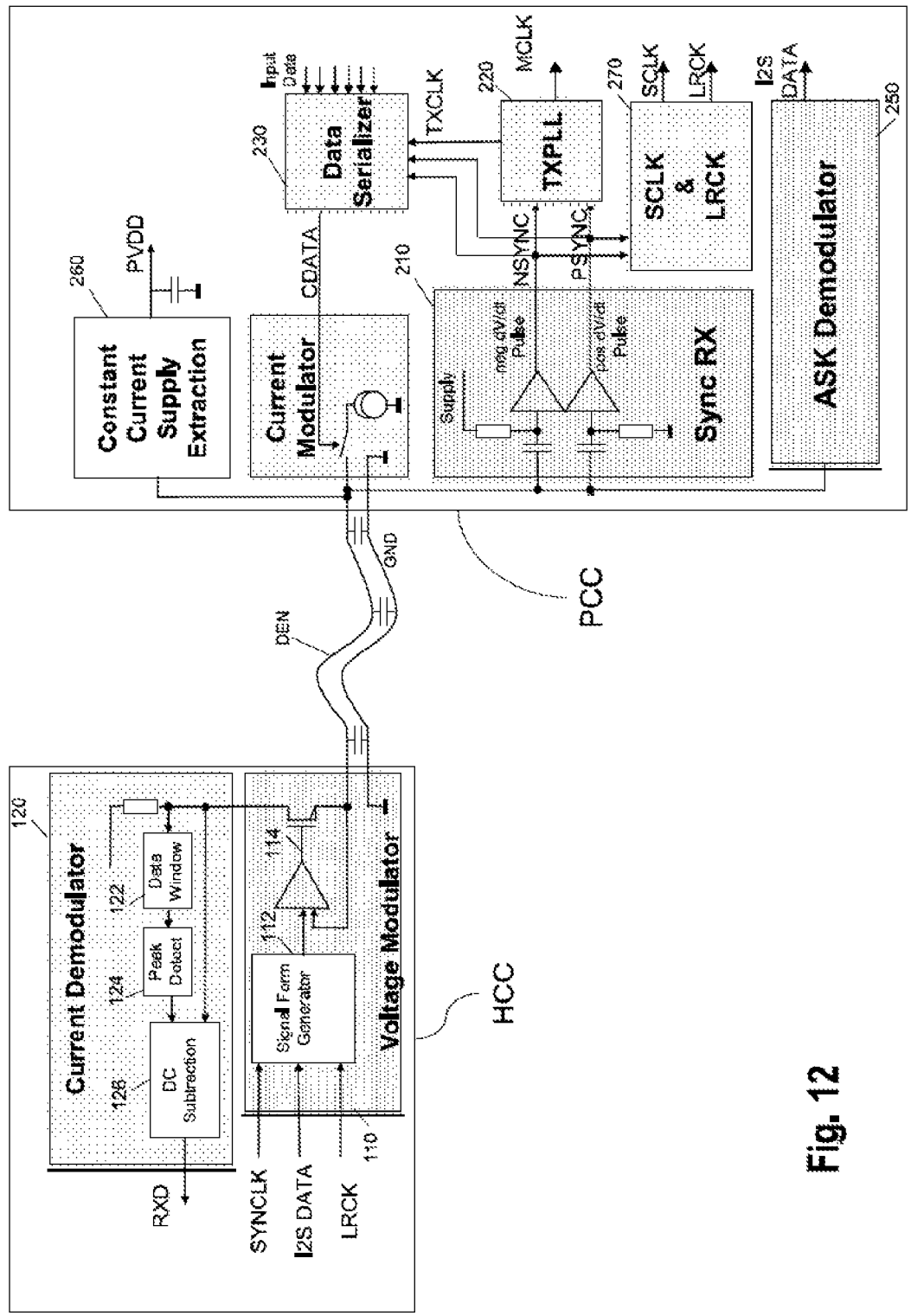
FIG. 12 shows a further embodiment of a communication system.

FIG. 12 shows a further embodiment of a communication system, which is based on the embodiment of FIG. 1 or FIG. 3 respectively. On the host side, the signal form generator 112 comprises further inputs for receiving I2S coded data I2S DATA, comprising for example digital audio data with two channels, and a left-right clock signal LRCK. On the client side, the client communication circuit comprises an ASK demodulator 250 as described above for reconstructing the I2S DATA signal from the voltage modulated signal VDEN. Furthermore, the client communication circuit PCC comprises a block 270 for reconstructing the reference clock signal SYNCLK and the left-right clock LRCK out of the sync signals NSYNC, PSYNC.

FIG. 13 shows an exemplary signal time diagram of signals being present during operation of a communication system being based on the embodiment of FIG. 12.

In this diagram, downstream data transmission via current modulation is not addressed but only the upstream data transmission from the host communication circuit HCC to the client communication circuit PCC. In particular, digital audio data for a left channel and a right channel with 24 data bits L0, . . . , L23, R0, . . . , R23 and two fixed slots FIX0. These fifty bits form one cycle of a 44.1 KHz cycle.

To distinguish between the left channel data and the right channel data, on the host side the left-right clock signal LRCK is provided which takes one of two states. For example, in the diagram of FIG. 13, the left-right clock signal LRCK takes a low state for the left channel data and a high state for the right channel data. Furthermore, as in the previous embodiments, the reference clock signal SYNCLK is present at the host side with one clock cycle per data slot. The I2S DATA signal represents, for example, a 24-bit coded audio signal with respective bit states. The signal form generator 112, respectively the voltage modulator 110, generates a respective resulting voltage modulated signal VDEN from the left-right clock signal LRCK, the reference clock signal SYNCLK and the I2S DATA signal, with a sawtooth formed signal. With reference to the previous embodiments, the clock edge of the reference clock signal SYNCLK is transmitted by means of the fast changing edge of the sawtooth signal, the left-right clock signal LRCK is encoded by respective polarity of the sawtooth signal and the bit state of the I2S DATA signal is encoded by different voltage step amplitudes.

On the client side, the sync pulses in the sync signal SYNC are generated, which here is shown commonly for the positive and the negative sync signals PSYNC, NSYNC. Furthermore, the left-right clock signal LRCK is derived from the two sync signals NSYNC, PSYNC. The clock generation circuit TXPLL 220 further restores the reference clock signal SYNCLK, which may be used as the microphone clock signal MCLK shown in FIG. 12. The client reference clock TXCLK is also generated from the sync signals NSYNC, PSYNC, but not shown here for reasons of a better overview. The ASK demodulator 250 performs the voltage step level detection in order to restore the derived data corresponding to the I2S DATA signal at the host side.

The data slot FIX0 is used to provide a defined transition between left and right channel in order to ease the detection on the client side. In particular, a change amplitude in the FIX0 slot is defined to be the lower change amplitude. In a development of the embodiment described in conjunction with FIG. 13, additionally control bits may be transmitted from the host side to the client side. To do so either the number of audio data bits can get reduced to a lower number of bits, or the downstream frame time from the client side to the host side is reduced such that there are more synchronization frames within one left-right clock frame.

The various embodiments described above describe a mode of operation during which all transmission parameters like absolute values of voltage step amplitudes, etc. are defined. However, a communication system may be adapted to perform a level adaptation that determines a minimum amplitude of the voltage step in the first period of the voltage modulated signal VDEN and a minimum amplitude of a current change in the current modulated signal IDEN. In particular, a minimum amplitude defines the least possible amplitude that can be detected by the respective receiving side of one of the modulated signals VDEN, IDEN.

For example, first a determination of the minimum voltage change amplitude is performed, and after the voltage change amplitude is found, the minimum current change amplitude is determined.

This can be done, for example, by establishing a data loop with data sent out from the host communication circuit HCC by amplitude shift keying ASK on the voltage modulated signal VDEN. The client communication circuit PCC sends back the received data by current modulation on one of the current modulation data slots. Preferably, the most critical data slot is used, which is the first used data slot after the steep edge of the voltage modulated signal VDEN. The host communication circuit HCC checks whether the retransmitted signal is correct and, in case of a correct transmission, decreases the change amplitude of the ASK modulated signal until the first transfer fails. Preferably, the last working change amplitude is taken for normal operation, possibly with a defined margin. Accordingly, the voltage change amplitude is defined after this process.

After that the level used for current modulation can get decreased in a similar fashion by checking the detection of the current change amplitude with a retransmission by means of the ASK modulated signal. Accordingly, a change amplitude of the current modulation used for operation can be derived from the last working change level with a defined margin. Such a level adaptation reduces the current consumption during operation as well as possible electromagnetic radiation on the data exchange node DEN.

As described above, the single signal line DEN can be used for upstream communication represented in a voltage mode modulation and for downstream data transfer in a current mode modulation. At the same time this wire DEN can be further used as a supply line to the client communication circuit PCC since the line is voltage driven by the host communication circuit HCC by the voltage modulation driver anyway. The voltage modulation might be done with an added DC-component to the described ASK modulation voltage shapes. This DC-voltage can be extracted on the client side and can be used as voltage supply by the PCC.

The embodiments described above can be combined together in various variations. In particular, each variation of the signal form of the voltage modulated signal VDEN can be used alone or in combination with any of the other described variations.

The invention claimed is:
1. A system comprising:
a host communication circuit that is adapted to be connected to a client communication circuit by means of a single signal wire, the host communication circuit being configured to perform a voltage modulation on the signal wire by generating a voltage modulated signal based on a reference clock signal;
in a first period of a clock cycle of the reference clock signal, to generate the voltage modulated signal with a significant voltage change based on a clock edge of the reference clock signal, wherein the significant voltage change is present during the first period;
in a second period of the clock cycle, to generate the voltage modulated signal with a voltage variation that is basically constant during said second period, wherein the clock cycle consists of the first period and the second period, and wherein the first period is significantly shorter than the second period; and
to demodulate a current modulated signal received via the signal wire from a connected client communication circuit; and
a client communication circuit that is adapted to be connected to the host communication circuit by means of a single signal wire, the client communication circuit being configured to generate a sync signal with one or more sync pulses, the generation of each sync pulse based on a detection of the significant voltage change within the voltage modulated signal received via the signal wire from the connected host communication circuit;

to generate a client clock signal based on the sync pulses of the sync signal, the sync pulses determining the clock cycle of the reference clock signal of the connected host communication circuit, wherein the client clock signal has a higher frequency than the sync signal; and to perform a current modulation on the signal wire by generating the current modulated signal based on the client clock signal and on data to be transmitted from the client communication circuit to the connected host communication circuit, wherein a current modulation based on the data to be transmitted is performed only after a predetermined settling time after one of the sync pulses until the respective following sync pulse, for each clock cycle of the reference clock signal respectively the sync signal.

2. The system according to claim 1, which is further configured to generate the voltage change of the voltage modulated signal in the first period with one of at least two change amplitudes selected on the basis of a data signal.

3. The system according to claim 1, which is further configured to generate the voltage modulated signal such that it starts in the second period with one of two predetermined voltage levels selected on the basis of a further data signal.

4. The system according to claim 1, which is further configured to generate the voltage modulated signal such that in each clock cycle of the reference clock signal a signal form of the voltage modulated signal is selected from one of the following:

a saw-tooth signal with a fast changing edge in the first period and a slow changing edge in the second period; and a signal having a peak pulse or spike pulse in the first period and a basically constant voltage in the second period.

5. The system according to claim 4, in which the signal form is selected permanently or based on a further data signal.

6. The system according to claim 1, which is further configured to demodulate the current modulated signal by generating a digital data signal based on the detection of one of two or more predetermined current levels within the current modulated signal.

7. The system according to claim 1, which is further configured to demodulate the current modulated signal only within the second period and after a predetermined time after the significant voltage change in the associated first period.

8. The system according to claim 7, which is further configured to demodulate the current modulated signal until the end of the respective clock cycle.

9. The system according to claim 1, wherein the host communication circuit and the client communication circuit are configured to perform a level adaptation that determines a minimum amplitude of the voltage change in the first period of the voltage modulated signal; and a minimum amplitude of a current change in the current modulated signal.

10. The system according to claim 9, wherein in order to determine the minimum amplitude of the voltage change, the host communication circuit is configured to generate the voltage change with a selected change amplitude, the client communication circuit is configured to determine whether the selected change amplitude is detectable, and to return respective information to the host communication circuit by means of the current modulated signal, and the host communication circuit is configured to gradually reduce the selected change amplitude until it is not detectable by the client communication circuit; and in order to determine the minimum amplitude of the current change, the client communication circuit is configured to generate the current change with a selected change amplitude, the host communication circuit is configured to determine whether the selected change amplitude is detectable, and to return respective information to the client communication circuit by means of the voltage modulated signal, and the client communication circuit is configured to gradually reduce the selected change amplitude until it is not detectable by the host communication circuit.

11. The system according to claim 1, wherein the significant voltage change is a voltage step or a peak pulse or a spike pulse.

12. A client communication circuit that is adapted to be connected to a host communication circuit by means of a single signal wire, the client communication circuit being configured to generate a sync signal with one or more sync pulses, the generation of each sync pulse based on a detection of a significant voltage change within a voltage modulated signal received via the signal wire from a connected host communication circuit;

to generate a client clock signal based on the sync pulses of the sync signal, the sync pulses determining a clock cycle of a reference clock signal of the connected host communication circuit, wherein the client clock signal has a higher frequency than the sync signal; and to perform a current modulation on the signal wire by generating a current modulated signal based on the client clock signal and on data to be transmitted from the client communication circuit to the connected host communication circuit, wherein a current modulation based on the data to be transmitted is performed only after a predetermined settling time after one of the sync pulses until the respective following sync pulse, for each clock cycle of the reference clock signal respectively the sync signal.

13. The client communication circuit according to claim 12, comprising a phase-locked loop circuit that is configured to generate the client clock signal using the sync signal as a reference.

14. The client communication circuit according to claim 13, which is further configured to generate the current modulated signal with one of two or more predetermined current levels for each clock cycle of the client clock signal based on digital data to be transmitted.

15. The client communication circuit according to claim 12, wherein the predetermined settling time is defined by a predetermined number of clock cycles of the client clock signal.

16. The client communication circuit according to claim 12, wherein the significant voltage change is a voltage step or a peak pulse or a spike pulse.

17. A method for communication between a host side and a client side, which are connected to each other by means of a single signal wire, the method comprising:

on the host side, performing a voltage modulation on the signal wire by generating a voltage modulated signal based on a reference clock signal;

on the host side, in a first period of a clock cycle of the reference clock signal, generating the voltage modulated signal with a significant voltage change based on a clock edge of the reference clock signal, wherein the significant voltage change is present during the first period;

on the host side, in a second period of the clock cycle, generating the voltage modulated signal with a voltage variation that is basically constant during said second period, wherein the clock cycle consists of the first period and the second period, and wherein the first period is significantly shorter than the second period;

on the client side, generating a sync signal with a respective sync pulse based on a detection of the significant voltage change;

on the client side, generating a client clock signal based on the sync pulses of the sync signal, wherein the client clock signal has a higher frequency than the sync signal;

on the client side, performing a current modulation on the signal wire by generating a current modulated signal based on the client clock signal and on data to be transmitted from the client side to the host side, wherein a current modulation based on the data to be transmitted is performed only after a predetermined settling time after one of the sync pulses until the respective following sync pulse, for each clock cycle of the reference clock signal respectively the sync signal; and on the host side, demodulating the current modulated signal.

18. The method according to claim 17, further comprising:

on the host side, generating the voltage change of the voltage modulated signal in the first period with one of at least two change amplitudes selected on the basis of a data signal; and on the client side, determining the selected change amplitude within the voltage modulated signal and reconstructing the data signal based on the determined change amplitude.

19. The method according to claim 17, wherein the current modulated signal is demodulated on the host side only within the second period and after a predetermined time after the significant voltage change in the associated first period.

20. The method according to claim 19, wherein the current modulated signal is demodulated on the host side until the end of the respective clock cycle.

21. The method according to claim 17, wherein the voltage modulated signal is generated such that it starts in the second period with one of two predetermined voltage levels selected on the basis of a further data signal.

22. The method according to claim 17, wherein the voltage modulated signal is generated such that in each clock cycle of the reference clock signal a signal form of the voltage modulated signal is selected from one of the following:

a saw-tooth signal with a fast changing edge in the first period and a slow changing edge in the second period;

a signal having a peak pulse or spike pulse in the first period and a basically constant voltage in the second period.

23. The method according to claim 17, wherein the significant voltage change is a voltage step or a peak pulse or a spike pulse.

* * * * *